March 29, 1966  O. J. B. ORWIN  3,242,874
CONVEYORS FOR CONVEYING GOODS
Filed Oct. 25, 1963  5 Sheets-Sheet 1

INVENTOR.
OLAF JOHN BARCLAY ORWIN
BY Kurt Kelman
agent

March 29, 1966     O. J. B. ORWIN     3,242,874
CONVEYORS FOR CONVEYING GOODS Filed Oct. 25, 1963     5 Sheets-Sheet 2

INVENTOR.
OLAF JOHN BARCLAY ORWIN
BY Kurt Kelman
agent

Fig. 4.

INVENTOR.
OLAF JOHN BARCLAY ORWIN
By Kurt Kelman
agent

March 29, 1966     O. J. B. ORWIN     3,242,874
CONVEYORS FOR CONVEYING GOODS

Filed Oct. 25, 1963     5 Sheets-Sheet 4

INVENTOR.
OLAF JOHN BARCLAY ORWIN
By Kurt Kelman
agent

March 29, 1966  O. J. B. ORWIN  3,242,874
CONVEYORS FOR CONVEYING GOODS
Filed Oct. 25, 1963

INVENTOR
OLAF JOHN BARCLAY ORWIN
By Kurt Kelman
agent

United States Patent Office 3,242,874
Patented Mar. 29, 1966

3,242,874
CONVEYORS FOR CONVEYING GOODS
Olaf John Barclay Orwin, Quinton, Birmingham, England, assignor to Fisher & Ludlow Limited, Tipton, England, a British company
Filed Oct. 25, 1963, Ser. No. 318,901
8 Claims. (Cl. 104—96)

This invention relates to conveyors for conveying goods, of the kind herein referred to as the kind specified, comprising two trolley supporting tracks, a plurality of wheeled goods carrying trolleys advanceable along each track, a pair of conveyor elements associated one with each trolley track, a power unit associated one with each conveyor element to drive the same and each conveyor element being provided at intervals along its length with driving dogs, each having a trolley driving face directed forwardly in relation to the trolley track, i.e., directed in the designed direction of trolley advancement, the trolley driving faces of the driving dogs being adapted to engage with driving abutments provided one on each trolley to advance the same along the track, the two trolley tracks meeting at a junction point, the arrangement being such that trolleys advancing on one track under the control of one of the two conveyor elements can be transferred at the junction point to the other of the two tracks to be advanced thereby under the control of the other of the two conveyor elements.

Hitherto in conveyors of the kind specified, in transferring the trolleys from one trolley track to another it has been necessary carefully to synchronize the speeds of the two conveyor elements, an arrangement as more fully explained later, which calls for the provision of expensive synchronizing gear. The provision of such synchronizing gear is necessary in order to ensure that when a trolley driving abutment which is engaged by a driving dog on one conveyor element passes out of control thereof for engagement with the driving dog of the other conveyor element, a driving dog of the latter will always be situated in a position immediately to the rear of the driving abutment of the trolley concerned so as to be in a position to engage therewith.

The present invention has for its object the provision of an improved arrangement which avoids the necessity for providing the synchronizing gear aforementioned and which greatly facilitates the transference of the trolleys from one trolley track to the other.

According to the present invention the conveyor element associated with that trolley track which is adapted to receive trolleys from the other trolley track has its driving dogs mouned for angular movement about a transverse axis which is situated rearwardly of the forwardly directed trolley driving face of the dog, said angularly movable driving dogs at a position spaced rearwardly of their trolley driving faces being provided with a trolley engaging face directed rearwardly of the associated dog and adapted to be engaged by the driving abutment of a trolley which is advancing towards the dog from the rearward side thereof but at a rate faster than the rate of advancement of the dog itself, the arrangement being such that when a driving abutment of such faster moving trolley contacts said trolley engaging face, the associated driving dog is adapted to be moved angularly into a trolley receiving position by the pressure of the advancing trolley to permit of the trolley abutment moving forwardly relative to the dog into a position for engagement by the trolley driving face of the dog.

Herein the expressions forward and rearward, forwardly and rearwardly, have reference to the designed direction of advancement of the trolleys along their associated trolley track.

Where the conveyor is so arranged that trolleys are required to be fed from a branch trolley track to a main trolley track the angularly movable driving dogs may be provided only on the conveyor element associated with the main trolley track. Where the conveyor is so arranged that the trolleys are adapted to be diverted when required from a main trolley track to a branch trolley track the angularly movable dogs may be provided only on the conveyor element which is associated with the branch trolley track.

Frequently, however, the branch trolley track is constituted by a track loop adapted at one end to receive trolleys from a second track such as a main trolley track and adapted at its other end to feed trolleys into the same main trolley track and under these circumstances the driving dogs on both conveyor elements would be mounted and arranged in accordance with this invention since in this latter case the driving dogs on both conveyor elements may be required to engage with trolleys advancing faster than the driving dogs themselves.

Also the construction of the driving dogs of both conveyor elements in accordance with this invention is in any event to be preferred irrespective of the arrangement of the two trolley tracks in that it enables the conveyor readily to be rearranged in accordance with the particular requirements of the user so as to provide for the reception by either conveyor element of trolleys advancing thereto at a rate faster than that of the conveyor element itself.

The present invention greatly facilitates the transference of a trolley from one track to the other without it being necessary as has hitherto been the case, to synchronize the speed of the two conveyor elements at the point of transference, an arrangement which calls for the provision of expensive mechanical or electrical synchronizing gear, usually electrical gear since it is customary for the two conveyor elements each to be driven by its own electric motor. Thus with the present invention at the point of transference, in the event of the trolley which is being transferred from a first track to a second track advancing relative to the second track at a speed faster than the speed of the second track conveyor element, the advancing trolley can engage from the rearward side thereof a driving dog of the second track conveyor element so as to effect controlled engagement therewith, while in the event of the rate of advancement of the trolley along the second track being less than the speed of the second track conveyor element, the trolley will be engaged by the trolley driving face of the next advancing driving dog of the second conveyor element and which is advancing forwardly relative to the trolley to effect engagement of the trolley in the normal manner.

The present invention is particularly applicable to that arrangement in which the conveyor element is disposed above the trolley track with the driving dogs depending from the conveyor element so that they are adapted to move angularly in an upward direction from their trolley driving to their trolley disengaged or inoperative position, and to move angularly in the reverse direction under their own weight.

The invention is illustrated in the accompanying drawings wherein:

FIGURE 7 is a view similar to FIGURE 3 but showing the position occupied by a driving dog when engaged by a trolley advancing from the rearward side thereof.

Figure 1:
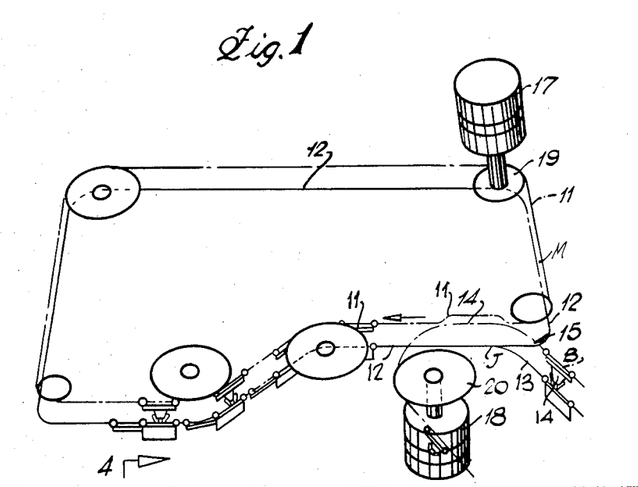
FIGURE 1 is a diagrammatic view of one form of conveyor embodying the present invention.
Figure 8:
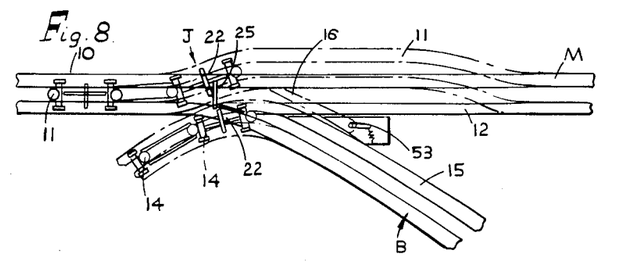
FIGURE 8 is a diagrammatic plan view showing the arrangement of the junction between the two trolley tracks, which junction is depicted diagrammatically at J in FIGURE 1.

Referring firstly to FIGURES 1 and 8 of the drawings the conveyor there illustrated comprises a main conveyor M and a branch conveyor B.

The main conveyor M comprises a track 10 for a main conveyor chain 11 of endless configuration beneath which main chain track 10 is disposed a main trolley track 12 also of endless configuration.

The branch conveyor B is provided with a branch trolley track 13, the branch track 13 being provided with its own branch conveyor chain 14 also of endless configuration supported from branch chain track 15, the latter and the branch chain 14 being depicted diagrammatically, except at the junction point J between the two tracks 12, 13.

At the junction point J between the two tracks there is provided a movable switch tongue 16 of known form so that trollers advancing in the designed direction indicated by the arrow in FIGURES 1 and 8 can be fed in from the branch track 13 or allowed to advance along the main track 12 in the known manner.

The two chains 11, 14 are each driven from their own power source 17, 18, respectively, through driving sprockets 19, 20, and by reason of the present invention as will later be herein made apparent, no special provision is required to ensure that the two chains are driven at precisely the same speed as has hitherto been necessary, an arrangement calling for precise synchronization of the two power sources, usually electrical motors, the provision of which synchronization means adds appreciably to the overall cost of the installation.

The two conveyor chains 11, 14, are each provided at intervals along their length with dependent housings 21 for pairs of trolley engaging dogs 22, 23. Each pair of dogs comprises a rearwardly disposed driving dog 22 having a forwardly directed trolley driving face 24 adapted to engage with a transversely extending driving bar 25 disposed above and mounted upon each trolley 26. Each pair of dogs further comprises a forwardly disposed trolley retarding dog 23 having a rearwardly directed face 27 which is engageable with the front face of each trolley driving bar 25 to prevent the trolleys overrunning the particular chain from which they are being driven.

With the present invention each driving dog 22 and in the arrangement illustrated, also each retarding dog 23 is mounted for angular movement about a transverse axis relative to the associated conveyor chain. For this purpose the two dogs 22, 23 of each pair of dogs at a position intermediate the upper and lower ends thereof and where they extend within the associated housing 21 are each formed at the side thereof opposite to its trolly driving bar engaging face 24, i.e. the rear side in the case of the driving dog 22, with a trunnion engaging portion 28. Such trunnion engaging portion is in the form of a lug having a bearing face 29 of substantially quarter circular configuration which extends downwardly and outwardly from the adjacent side of the dog i.e. the rear side in the case of the driving dog 22.

Figure 4:
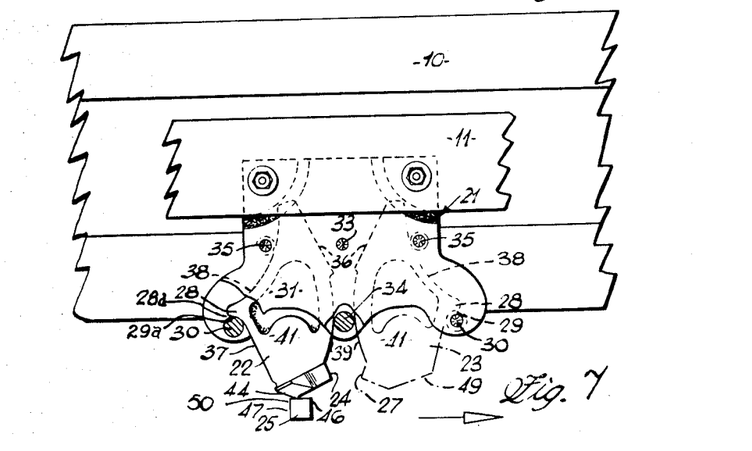
FIGURE 4 is a cross sectional view on the line 4—4 of FIGURE 2 depicting the dog housing shown in FIGURE 2 and also depicting in end elevation one of the driving dogs.

The trunnion engaging portion 28 is continued beyond the bearing face 29 as a substantially horizontal portion 28a, the under face 29a of which is flat and horizontal considering the associated dog in its operative position. Each bearing face 29 engages with the adjacent side of corresponding trunnion pin 30 which at the rear side of the dog 22 and the front side of the dog 23, extends transversely between the two transversely spaced plates 31 constituting each dog housing 21, see FIGURE 4.

The arrangement is such that the lower end of each driving dog 22 providing the forwardly directed driving face 24 is adapted to be swung in an upward and forward direction about the trunnion pin 30 as the dog 22 moves from its operative or driving into its inoperative position, while in the case of the retarding dog 23 the corresponding rearwardly directed face 27 thereof is adapted similarly to be moved in an upward and rearward direction as the dog 23 swings about its trunnion pin 30.

The two plates 31 forming each dog housing 21 are connected together by a pair of vertically spaced pins 33, 34, disposed intermediate the two dogs 22, 23, and the two plates 31, with the pin 33 spaced above the pin 34 substantially equidistantly between the upper and lower edges of the dog housing plates 31.

These two plates are also connected together by a further pair of pins 35 disposed at the same horizontal level as that of the pin 33 but arranged one at each end of the housing 21.

Thus, the two housing plates 31 are connected together by six pins in all, namely by the two trunnion pins 30, and by the aforementioned pair of connecting pins 35 as well as by the pins 33 and 34.

Figure 2:
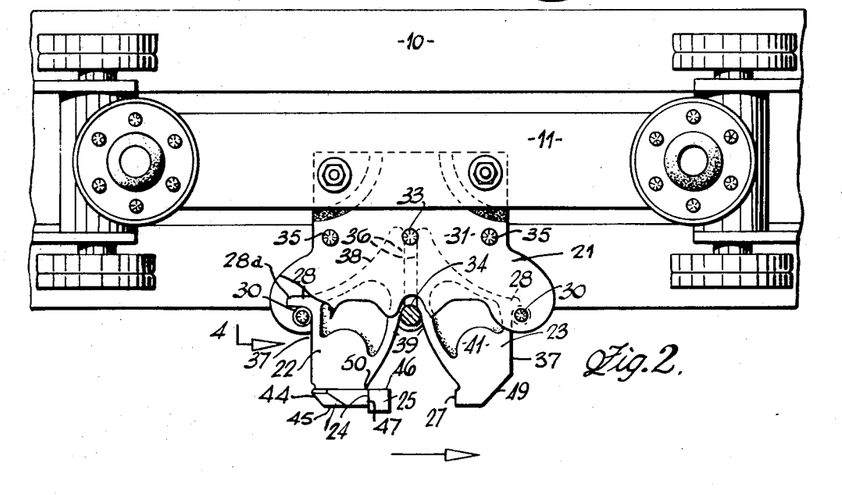
FIGURE 2 is a side elevation to an enlarged scale depicting part of the conveyor chain of the conveyor shown in FIGURE 1 together wtih one of its driving dogs, the latter being depicted in the operative or driving position.
Figure 3:
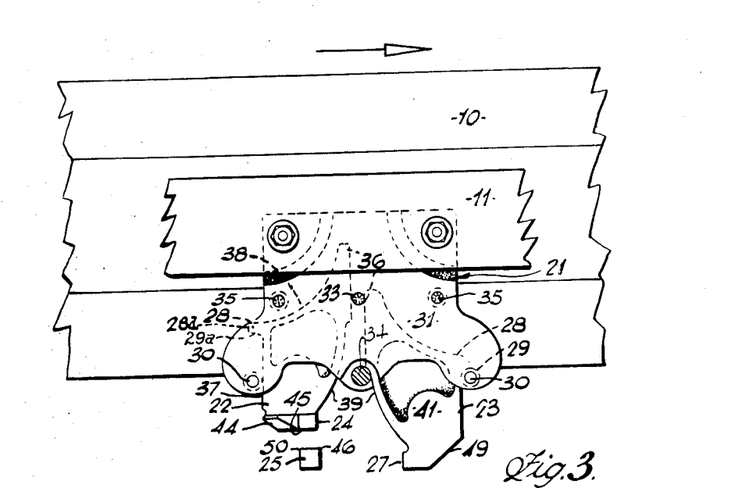
FIGURE 3 is a view similar to FIGURE 2 showing the driving dog in its inoperative position when raised by means of a dog lifting member provided on each trolley.

The opposed faces 36 of the two dogs 22, 23, near their upper ends, i.e. above the level of their respective axes of pivoting, are planar and these planar faces are adapted to abut against the adjacent side of connecting pin 33 so as to limit the downward pivotal movement of each dog relative to the housing 21 so that with the two dogs in their operative position as depicted in FIGURE 2, the dog faces 36 are in engagement with pin 33 which accordingly constitutes a stop for limiting the downward pivotal movement of the dogs.

Each dog 22, 23, at the side thereof opposite to the aforementioned planar face 36, is formed at a position adjacent its trunnion engaging portion 28 with a vertically dependent planar face 37 which is parallel to the dog face 36 and these two faces 36, 37 which are respectively in engagement with pin 33 and the corresponding trunnion pin 30 coact with these pins in guiding each dog for vertical sliding movement, when subjected as later described herein, to the upwardly directed pressure of a dog lifting member mounted on each trolley 26. Such upward vertical movement of each dog 22, 23 is limited by the engagement of the upper side 38 of each dog with adjacent connecting pin 35.

In order to permit of each dog moving angularly about its trunnion pin 30 without the dog fouling the lower of the two centrally disposed connecting pins, namely, pin 34, the lower portions 39 of the opposed faces of the two dogs are cut away or chamfered to part circular or substantially part circular configuration with the axis of curvature coincident or substantially coincident with the center of the associated trunnion pin 30 and each of these part circular faces 39 is adapted frictionally to engage with the adjacent above mentioned connecting pin 34 which accordingly constitutes a dog retarding pin. The arrangement is such that as each dog swings angularly from its lower operative position depicted in FIGURE 2 into its pivotal raised position depicted in FIGURE 7 in respect of both dogs, the part circular face thereof 39 slides over the dog retarding pin 34 so that an appreciable frictional force is provided for resisting the upward angular movement of each dog 22, 23.

This is of particular importance in the case of the driving dogs 22 as without such provision in the event of the associated conveyor chain vibrating in the direction of its length as frequently occurs, there is a serious risk that the driving dogs 22 may be vibrated, i.e. swung in an upward direction about their trunnions 30, out of engagement with the associated trolley driven bar 25. This is particularly the case if under the effect of chain vibration the conveyor chain momentarily advances rearwardly so as to bring the driving face 24 of the driving dog 22 well clear of the trolley driving bar 25. Such untoward possibility in addition to being prevented by the aforementioned frictional engagement between curved dog face 39 and retarding pin 34 is further inhibited by the fact that the center of gravity of each dog including each driving dog 22 is spaced in a fore and aft direction relative to the associated trunnion pin 30 so that the mass of the dog exerts an appreciable momentum about pin 30 tending to restrain the dog against angular movement from the position of FIGURE 2 to the position of FIGURE 7.

The aforementioned upward pivotal movement of each dog is limited by the engagement of the upper face 38 thereof with the adjacent housing connecting pin 35 as shown in FIGURE 7.

Each driving dog 22 is provided at its lower end with a tail 40 which extends transversely of the length of the associated conveyor chain beyond each of the two side faces 41 of the associated dog.

These tails 40 are provided for the purpose of transferring the trolleys 26 from the main trolley track 12 to the branch trolley track 13 and vice versa and project laterally in relation to the longitudinal center line of their associated conveyor chain by a distance such that there is no possibility of the lateral extremity of the dogs of one chain fouling any of the tails 40 associated with the other conveyor chain at the junction between two trolley tracks depicted diagrammatically in FIGURES 1 and 8.

Figure 9:
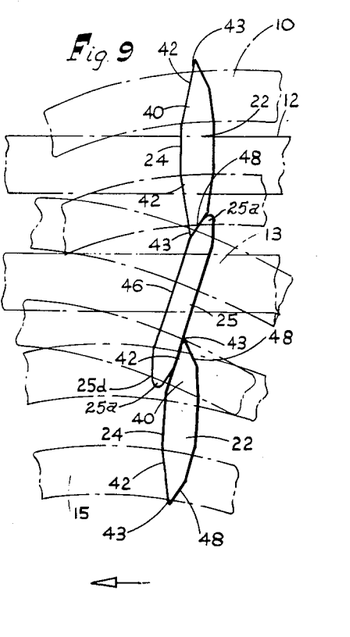
FIGURES 9 and 10 are plan views of part of the driving dogs illustrating diagrammatically two successive stages in the transference of a trolley driving abutment from a driving dog of one conveyor chain to a driving dog of the other of the two conveyor chains depicted in FIGURE 8 as the trolley is transferred from one to the other of the two tracks also depicted in FIGURE 8.

As shown in FIGURES 2 and 9 each tail 40 provides medially of the width of the tail the aforementioned trolley driving face 24, which with the dog 22 in its driving position depicted in FIGURE 2 is vertical and extends transversely perpendicular to the direction of dog advancement by the associated conveyor chain. On either lateral side of this forwardly directed trolley driving face 24 the forwardly directed face of the tail 40 is inclined as shown at 42 in a direction rearwardly towards the adjacent lateral extremity 43 of the tail 40.

As best shown in FIGURE 2 the tail 40 on the rearwardly directed face thereof is chamfered as indicated at 44, the chamfering being in a forward direction downwardly towards the under face 45 of the tail 40. The provision of the chamfered face 44 enables the driving bar 25 of a trolley advancing at a rate faster than that of a driving dog from a position immediately behind the same, to achieve driving engagement with such driving dog 22 with the latter initially in its lowered driving position as in FIGURE 2. Such engagement is effected by the upper forwardly directed edge 46 of the driving bar 25 making contact with the rearwardly directed chamfered face 44, thereby as the driving bar advances causing the driving dog 22 to swing upwardly about its trunnion pin 30 into a trolley receiving position as shown in FIGURE 7 in which the trolley driving bar 25 can now move forwardly relative to the driving dog 22 beneath the tail 40. Such relative forward movement of the trolley driving bar 25 continues until it clears the under face 45 of the tail 40, thus permitting of the dog 22 swinging under its own weight about trunnion pin 30 from the position depicted in FIGURE 7 into the driving position depicted in FIGURE 2 so as now to be in a position to transmit drive to the above mentioned trolley driving bar 25.

The aforementioned chamfered face 44 at the rear side of each tail 40 merges near each lateral extremity 43 into a more acutely tapered face 48 which terminates at the aforementioned lateral extremity 43 of the tail 40. Each of these more acutely tapered faces 48 serves as later described with reference to FIGURES 9 and 10 to facilitate engagement of a driving dog with a trolley driving bar 25 in the case where the trolley is so positioned near the convergence between the two tracks 12, 13, that the trolley driving bar 25 is substantially transversely aligned with tail 40 but moving laterally relative to such tail as the point of convergence between the two trolley tracks is approached.

The retarding dog 23 is unprovided with a tail since these dogs are not required drivingly to engage with trolleys where the two trolley tracks 10, 13 converge but to take care of the case where at the position of engagement between one or the other of the two conveyor chains 11 and 14 and an associated trolley, the trolley is moving faster than the chain, the forwardly directed face of the retarding dog 23 is chamfered as indicated at 49 in FIGURE 2, the chamfering being in a downward direction rearwardly in relation to the dog 23, i.e. towards the rearwardly directed face 27 thereof and the arrangement permits of the relative faster advancing retarding dog 23 riding over the rearwardly directed upper corner 50 of a trolley driving bar 25 with the retarding dog pivoting about its associated trunnion 30 in an upward and forward direction relative to housing 21, as shown in FIGURE 7. Here the retarding dog 23 is depicted in dashed outline in its upwardly pivoted or raised position, as it would not in practice be in such position simultaneously with driving dog 22 also so depicted in FIGURE 7.

The trolleys 26 are formed in the known manner as wheeled trolleys so as to embody load supporting wheels 51 which are adapted to be supported in the known manner from the two trolley tracks, namely the main track 12 and the branch track 13. At the junction J between the two tracks there is further provided in the known manner a switch tongue 16 mounted at 53 for pivotal movement in a horizontal plane, which tongue 16 is adapted to be disposed in one or the other of two extreme positions so as to guide the wheeled trolleys for movement either from the main track to the branch track and vice versa or else to guide the trolleys for advancement straight along the main track.

Figure 5:
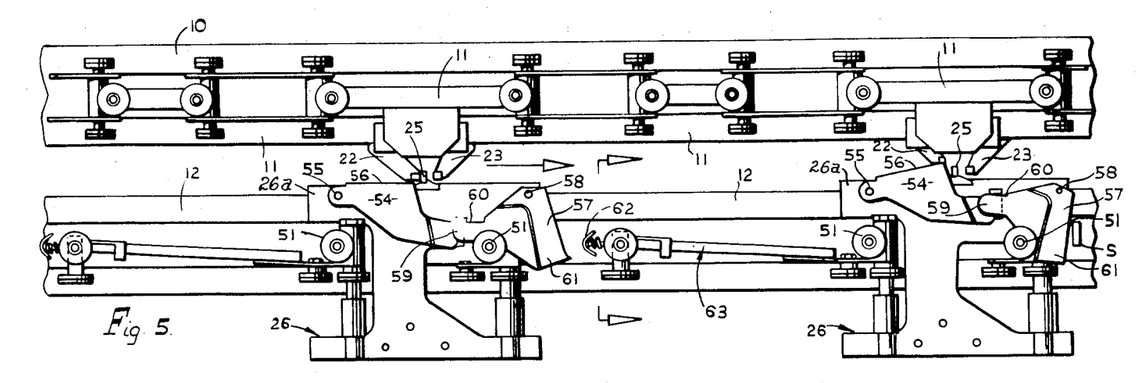
FIGURES 5 and 6 are side elevations of part of the conveyor depicted in FIGURE 1 showing the operation of the dog lifting members provided on the trolleys, the two figures respectively showing the driving dogs in the positions depicted in FIGURES 2 and 3 respectively.
Figure 6:
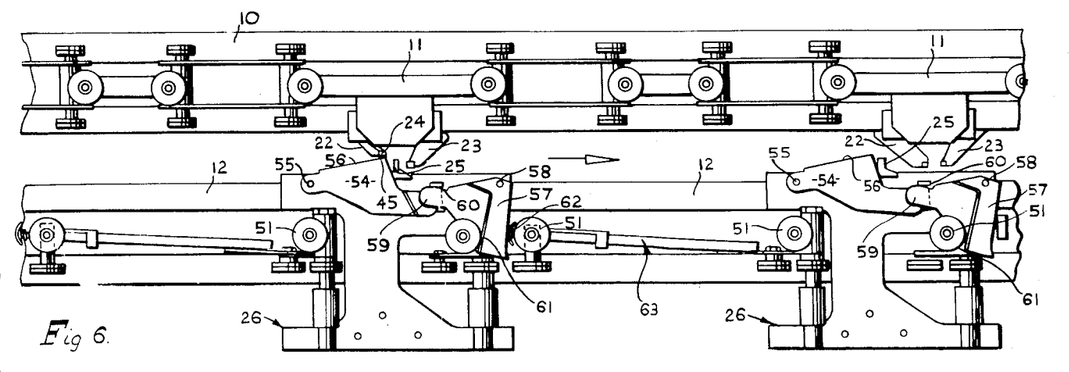

Provision is made for controlling the spacing between trolleys 26 advancing successively along either of the two tracks and in the arrangement illustrated this is in accordance with the invention the subject of co-pending United States patent application Serial No. 318,900 filed October 25, 1963, comprising the provision of each trolley 26 with a dog lifting member 54 pivoted about a horizontal transverse axis at 55 to the rear end of the body 26a of trolley 26. This dog lifting member 54 is of inverted channel form in cross section and the upper face 56 of its connecting portion is adapted to engage with the under face 45 of each driving dog 22 so as to lift such driving dog upwardly relative to its housing 21 in the event that the dog lifting member is swung upwardly from the horizontal inoperative position depicted in FIGURE 5 into the operative position depicted in FIGURE 6.

In this operative position the upper face 56 of the dog lifting member slopes upwardly in a forward direction to an extent such that the dogs, in particular the driving dogs 22 of either conveyor chain, i.e. main track chain 11 or branch track chain 14 as the case may be, are lifted upwardly relative to their housings 21 to a height such that their undersides 45 are clear of the upper side of the driving bar 25 of the particular trolley, thereby permitting of the trolley being retained in an arrested position.

The aforesaid movement of the dog lifting member 54 is controlled by a striker member 57 mounted on the forward portion of the trolley body for pivotal movement at 58 about a horizontal transverse axis, the striker member being constructed on the form of a two armed lever, one arm 59 of which extends rearwardly from the pivot 58 and is articulated at 60 to the dog lifting member 54 as described in the co-pending application aforesaid.

The other arm 61 of the striker member depends forwardly and downwardly from its pivot 58 and as described in the application aforementioned, is adapted to engage with a spring loaded stop 62 mounted on the rear end of a spacer element 63 which extends rearwardly from the preceding trolley.

The arrangement is such that when the first of a succession of trolleys constructed as above described is arrested in the manner described more particularly in the aforementioned co-pending application, the spring loaded stop member at the rear end of the spacer element of the arrested trolley engages with the depending arm 61 of the striker member 57 so as to displace this in a rearward and downward direction relative to its associated trolley and thus raise the dog lifting member on such trolley to lift the dog previously driving such trolley and permit of the latter being brought to rest and maintained arrested as above described.

Figure 10:
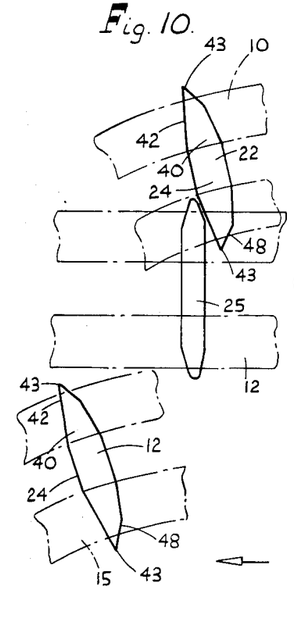

Reference is now directed to FIGURES 9 and 10 which illustrate diagrammatically what happens when a trolley advances from the branch trolley track 13 in a direction towards the main trolley track 10. Such trolley advancing along the branch trolley track 13 will be advanced under the control of its associated branch conveyor chain 14 and it is required to disengage the driving bar 25 of such trolley from a previously engaged driving dog 22 on the branch chain 14 and to effect driving engagement between such trolley driving bar 25 and one of the driving dogs 22 on the main track conveyor chain 11.

Disengagement of the driving bar 25 of each trolley 26 on branch track 13 from the driving dogs on the branch conveyor chain 14 and the engagement of such trolley driving bar with the driving dogs on the main conveyor chain 11 is effected as shown in FIGURE 8 and by the fact that at the junction point the two conveyor chains 11, 14 with their respective tracks 10, 15 are offset laterally in relation to their corresponding trolley tracks 12, 13 respectively. Such offsetting is in a horizontal plane with the direction of offsetting of chain 14 and its track 15 opposite to that of chain 11. Thus as each trolley on the branch track 13 approaches the junction with the main track 12 its driving bar 25 is caused to move laterally in relation to the associated branch chain driving dog 22 into the position depicted diagrammatically in FIGURE 9.

In this position the one of the two lateral extremities 25a of the trolley driving bar 25 has now reached a position in which it is aligned with one of the lateral extremities 43 of a tail 40 of one of the driving dogs 22 on the main conveyor chain 11. Such chain 11 with its track 10 is, as above described, offset in a direction opposite to that of claim 14 so that only the lateral extremity 43 of driving dog tail 40 is brought into a position for engaging with the said lateral extremity 25a of trolley driving tail 40.

In the event that the main conveyor chain 11 has a velocity greater than that of the branch conveyor chain 14, then the projecting extremity 25a of the trolley driving bar 25, which is still advancing in a converging direction relative to main chain 11 will be engaged by the tail extremity 43 of the next successively advancing main chain driving dog so as to be engaged by the adjacent forwardly directed inclined face 42 of the tail 40 of such dog and after engagement has first occurred in this way, as the trolley advances from the branch track 13 continues to converge towards the main trolley track 12, its driving bar 25 will be displaced laterally in relation to the branch track conveyor chain 14 so as to be completely disengaged from the driving dogs of the latter by the time the driving dog 22 on the main chain 11 has fully engaged with the trolley driving bar 25.

Transference of the trolley from the branch track to the main track under the foregoing conditions with the main track chain 11 moving faster than the branch track chain 14, is facilitated by the fact that the width in a fore and aft direction of the trolley driving bar 25 is substantially less than the distance between the opposed faces 24, 27 of each pair of dogs 22, 23 so that the driving bar 25 is free to move forwardly by an appreciable distance relative to the branch chain driving dog 22 before it is in any danger of fouling the adjacent retarding dog 23. Also the difference in speed between the two chains is not great, i.e. the difference is merely a small fraction of the speed of either chain.

In the event that the main chain 11 has a velocity less than that of the branch chain 14, as a projecting end 25a of a trolley driving bar 25 moves laterally relative to the branch chain 14 while still driven by a branch chain dog, such projecting driving bar end 25a will move into the path of one of the tail extremities 43 of a main chain dog, and such projecting end 25a may, as shown in FIGURE 9 be forced by the still engaged branch chain driving dog against the rear face of the tail 40 of one of the main dogs 22.

Under these circumstances the driving dog 22 on the main chain swings upwardly and forwardly about its trunnion pin 30 as already described, i.e. as shown in FIGURE 7 so as to permit of the driving bar 25 moving forwardly relative to the main chain 11 with the upper face of the driving bar 25 in engagement with the dog tail 40 of the at present pivotally raised main chain dog until the rear upper corner 50 of bar 25 is clear of the dog tail 40 to permit of the associated dog swinging gravitationally back to its driving position in which its driving face 24 is now adapted to engage with the rearwardly directed face 47 of bar 25 as shown in FIGURE 10, in which the trolley bar 25 is now in driving engagement with a main chain driving dog 22.

The aforementioned lifting under the above conditions of a main chain dog 22 can occur where the projecting end 25a of trolley driving bar 25 abuts against driving dog tail face 48 or 44, since both of these rearwardly directed faces are chamfered on their undersides as earlier described so that the upper forward corner 46 of each faster advancing driving bar 25 is well adapted to exert a wedge lifting action on the tail 40 of each main chain driving dog 22.

To take care of the particular case in which an end 25a of driving bar 25 abuts directly against adjacent extremity 43 of main chain driving dog tail not only is such extremity 43 of V configuration as viewed in plan, but the same configuration is adopted for each end 25a of each trolley driving bar 25 so that under these circumstances there is merely line engagement between the end of the trolley driving bar 25 and the adjacent extremity of the driving dog tail with the result that in practice, the engaged end 25a of the driving bar will be forced round one or the other of the two sides of tail extremity 43 into engagement with either tail face 42 or 48 according to whether the trolley is moving slightly faster or slightly slower than the main conveyor chain. Absolute identity between the two speeds will not in practice occur and can in any event be precluded by designedly running one chain at a speed slightly different from that of the other chain.

Thus, with the present invention it is possible for the trolleys to be transferred from one trolley track to another, without it being necessary for the trolley driving chains on the two tracks to be at the same precise velocity, a result which is very difficult to achieve if as is usually the case, the two chains are each driven from a corresponding electric motor, so that complicated and expensive synchronization gear is required to ensure that the two motors are always being driven at precisely the same speed, and the necessity for such complicated and expensive gear is avoided with this invention.

What I claim then is:

1. A powered trolley conveyor of the kind comprising main and branch trolley supporting tracks with a track junction connecting said two tracks, main and branch powered conveyor elements extending parallel to and above the said main and branch trolley tracks and each carrying dependent trolley driving dogs having forwardly directed trolley driving faces, a plurality of trolleys supported from said tracks, two power driving units respectively and separately power driving said main and branch conveyor elements, means for transferring trolleys from the branch track to the main track at the track junction and laterally offsetting each of the two conveyor elements relative to their corresponding trolley supporting tracks, with the offsetting of the conveyor elements being in directions opposite to one another, means mounting each trolley driving dog for movement relative to the associated conveyor element between an upper inoperative position and a lower trolley driving position, a driving bar on each trolley extending transversely of the associated trolley track and engageable with each of said trolley driving dog faces, a tail mounted on each driving dog and extending laterally on each of the lateral sides thereof with the tails of the dogs of the two conveyor elements projecting towards one another at the junction between the two trolley tracks, each tail together with the associated driving dog having the rear face thereof inclined downwardly in a direction towards the forwardly directed driving face of the dog with said downwardly inclined faces engageable with the driving bars of relatively faster advancing trolleys and each end of the tail being tapered in a lateral direction towards the extremity of the tail.

2. A powered trolley conveyor of the kind comprising main and branch trolley supporting tracks with a track junction connecting said two tracks, main and branch powered conveyor elements extending parallel to and above the said main and branch trolley tracks and each carrying dependent trolley driving dogs having forwardly directed trolley driving faces, a plurality of trolleys supported from said tracks, two power driving units respectively and separately power driving said main and branch conveyor elements, means for transferring trolleys from the branch track to the main track at the track junction and laterally offsetting each of the two conveyor elements relative to their corresponding trolley supporting tracks, with the offsetting of the conveyor elements being in directions opposite to one another, means mounting each trolley driving dog for movement relative to the associated conveyor element between an upper inoperative position and a lower trolley driving position, a driving bar on each trolley extending transversely of the associated trolley track and engageable with each of said trolley driving dog faces, a tail mounted on each driving dog and extending laterally on each of the lateral sides thereof with the tails of the dogs of the two conveyor elements projecting toward one another at the junction between the two trolley tracks, each tail together with the associated driving dog having the rear face thereof inclined downwardly in a direction towards the forwardly directed face of the dog and the forwardly directed face of each trolley driving bar being tapered rearwardly at each end of the bar in a direction towards the extremity of the bar end.

3. A conveyor according to claim 1, characterized in that each trolley is provided with a dog lifting member mounted movably thereon between a lower inoperative position and an upper operative position in which the dog lifting member is adapted to engage with the underside of a driving dog on an associated conveyor element so as to lift such dog in a substantially vertical direction and disengage the same from the previously engaged trolley to disconnect the drive thereto, a striker member mounted on the forward end of each trolley and engageable by a rearwardly directed abutment on a preceding trolley of a number of successively advancing trolleys to displace the striker member rearwardly in relation to its associated trolley, means operably connecting each striker member to the dog lifting member of the associated trolley to displace said lifting member into its operative position when said striker member moves rearwardly of its trolley, the arrangement being such that in the event of the first of a number of trolleys advancing along a trolley track being arrested, the drive from the conveyor element to one or more following trolleys is successively disconnected with the trolleys maintained in spaced relation to one another.

4. A conveyor according to claim 3, characterized in that at a position situated immediately forwardly of each driving dog is a retarding dog mounted in manner similar to each driving dog for angular movement relative to the conveyor element but in an angular sense opposite to that of each adjacent driving dog, each retarding dog being formed with a trolley driving bar engaging face adapted when engaged by a trolley driving bar to apply pressure to the retarding dog to move this angularly in an upward and rearward direction to permit of the retarding dog advancing relative to the trolley driving bar and allow of the latter occupying a position in which it is between a retarding dog and an adjacent driving dog.

5. A conveyor according to claim 3 wherein means are provided for mounting each driving dog for angular movement relative to the associated conveyor element about an axis transverse to the length of said element in such a manner that the lower end of each driving dog is displaced in both a forward and an upward direction relative to the associated conveyor element when the rearwardly inclined face of said dog is engaged by the driving bar of a relatively faster moving trolley.

6. A conveyor according to claim 5 wherein the means mounting each driving dog for angular movement comprise a pair of transversely spaced plates provided at intervals along the length of each conveyor element, a dog retarding pin extending between the two plates of each pair at a position forwardly in relation to each driving dog, each driving dog at a position above its trolley driving face having a convex retarding pin engaging face, the center of curvature of which is substantially coincident with the transverse axis of angular movement of the dog, each of said convex dog faces having fractional engagement with said retarding pin.

7. A conveyor according to claim 5 wherein the means mounting each driving dog for movement relative to the associated conveyor element comprise a pair of dog housing plates provided at intervals along the length of each conveyor element, the two plates of each pair supporting opposite ends of a trunnion pin and each driving dog at a position situated rearwardly in relation to the trolley driving face of the dog having a trunnion engaging portion embodying a downwardly directed part-circular bearing face which engages with the upper side of the trunnion pin, the arrangement being such that the dog can move angularly about said trunnion pin and is displaceable relative thereto in a direction upwardly of the associated dog housing.

8. A conveyor according to claim 5 wherein each driving dog is mounted for vertical sliding movement within a housing comprising a pair of housing plates mounted on the conveyor element with a trunnion pin and a guide pin extending between the two plates parallel to one another with a guide pin situated forwardly of the trunnion pin, each dog on the rearwardly directed side thereof having a trunnion engaging portion embodying a downwardly directed part-circular bearing face having detachable pivotal engagement with the upper side of the trunnion pin, the dog at the forwardly directed side thereof having a substantially vertical face in slidable engagement with said guide pin.

(References on following page)

References Cited by the Examiner

UNITED STATES PATENTS

| | | | |
|---|---|---|---|
| 2,688,936 | 9/1954 | Brooks | 104—104 |
| 2,868,138 | 1/1959 | Bishop et al. | 104—88 |
| 2,875,704 | 3/1959 | Yates | 104—96 |
| 2,949,862 | 8/1960 | Klamp | 104—88 |
| 3,044,415 | 7/1962 | Dehne | 104—172 |

EUGENE G. BOTZ, *Primary Examiner.*

MILTON BUCHLER, ARTHUR L. LA POINT,
*Examiners.*

F. W. MONAGHAN, *Assistant Examiner.*